(12) United States Patent
Mohr

(10) Patent No.: US 6,322,162 B2
(45) Date of Patent: Nov. 27, 2001

(54) ACTUATING DEVICE FOR AN ELECTROHYDRAULIC VEHICLE BRAKE SYSTEM

(75) Inventor: Kurt Mohr, Halsenbach (DE)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/756,317

(22) Filed: Jan. 8, 2001

Related U.S. Application Data

(63) Continuation of application No. PCT/EP99/05294, filed on Jul. 23, 1999.

(30) Foreign Application Priority Data

Jul. 23, 1998 (DE) .............................................. 198 33 084

(51) Int. Cl.⁷ .............................. B60T 13/66; B60T 13/12
(52) U.S. Cl. ...................... 303/114.1; 188/358; 60/547.1
(58) Field of Search .................................... 188/358, 359, 188/114.1; 303/122.11, 122.13; 60/547.1, 550, 581, 582

(56) References Cited

U.S. PATENT DOCUMENTS

| | | | |
|---|---|---|---|
| 4,586,591 | * | 5/1986 | Belart ................................... 188/358 |
| 4,708,404 | * | 11/1987 | Seibert et al. ........................ 303/114 |
| 4,736,995 | * | 4/1988 | Reinartz et al. ...................... 188/358 |
| 5,022,716 | | 6/1991 | Siegel et al. . |
| 5,112,115 | * | 5/1992 | Willmann et al. .................... 188/358 |
| 5,531,509 | * | 7/1996 | Kellner et al. ........................ 188/358 |
| 5,544,948 | | 8/1996 | Schmidt et al. . |
| 5,839,280 | * | 11/1998 | Troester et al. ...................... 60/547.1 |

FOREIGN PATENT DOCUMENTS

| | | |
|---|---|---|
| 31 31 856 A1 | 2/1983 | (DE) . |
| WO96/11129 | 4/1996 | (WO) . |
| 196 38 102 C1 | 8/1997 | (DE) . |

* cited by examiner

*Primary Examiner*—Christopher P. Schwartz
(74) *Attorney, Agent, or Firm*—MacMillan, Sobanski & Todd, LLC

(57) ABSTRACT

An actuating device for an electrohydraulic vehicle brake system has an emergency brake cylinder (2) which comprises a piston (24, 25), the latter being displaceable in a housing (21), and which can be actuated by means of a brake pedal (1), and a simulation device (4) for simulating a force/displacement action of the brake pedal (1), wherein the simulation device (4) is connected in series and disposed after the emergency brake cylinder (2) in the direction of force from the brake pedal (1) to the emergency brake cylinder (2). In order to hydraulically uncouple the simulation device (4) from the emergency brake cylinder (2), the emergency brake cylinder (2) is supported at the simulation device (4) and the piston (24, 25) can be locked relative to the housing (21) such that the simulation device (4) can be mechanically actuated by the emergency brake cylinder (2).

23 Claims, 1 Drawing Sheet

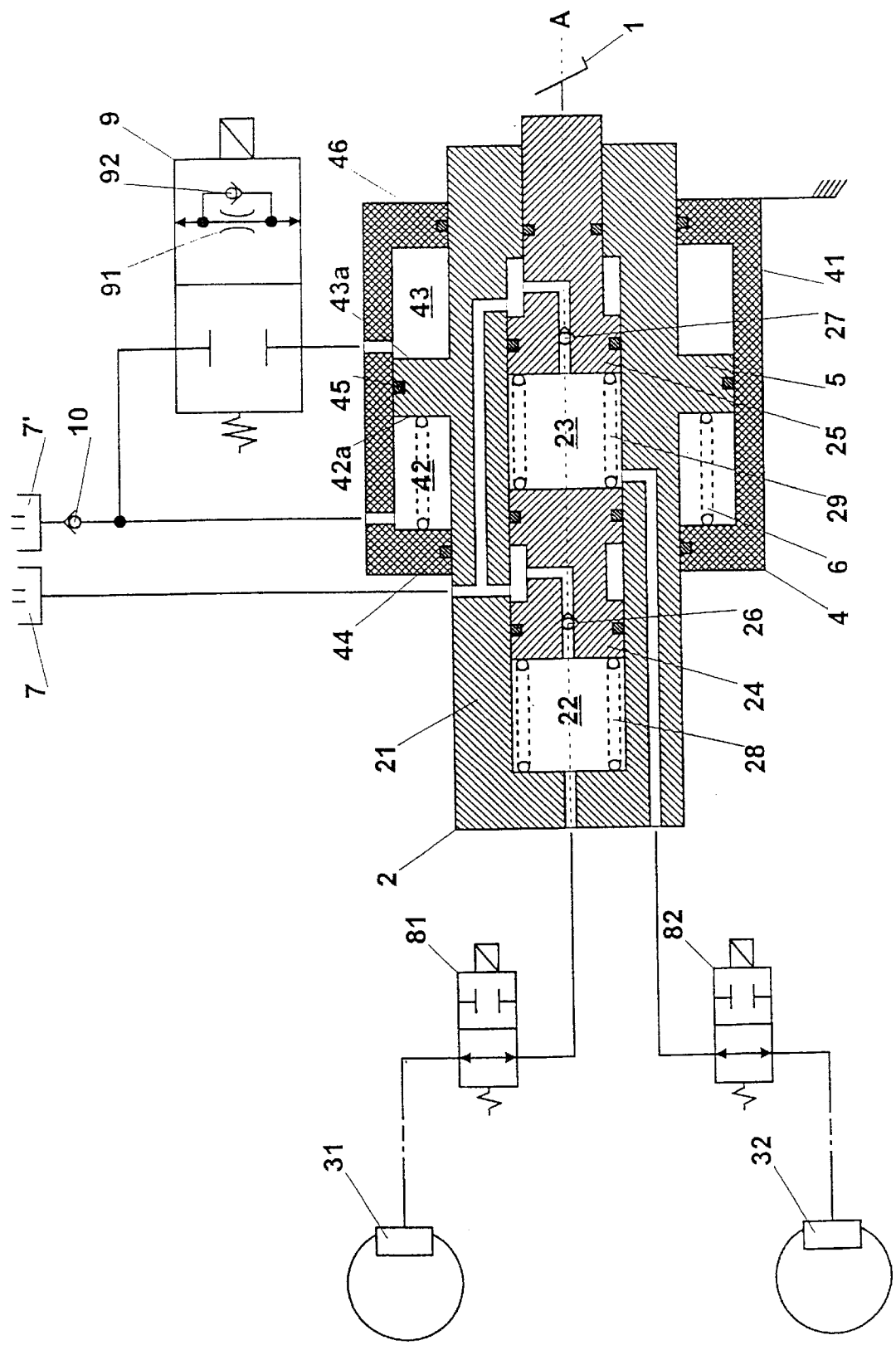

ACTUATING DEVICE FOR AN ELECTROHYDRAULIC VEHICLE BRAKE SYSTEM

CROSS-REFERENCE TO RELATED APPLICATIONS

This application is a continuation of co-pending international application PCT/EP99/05294, filed Jul. 23, 1999, which claimed priority to German patent application number 198 33 084.7, filed Jul. 23, 1998.

BACKGROUND OF THE INVENTION

The invention relates to an actuating device for an electrohydraulic vehicle brake system, with an emergency brake cylinder which comprises a piston, the latter being displaceable in a housing, and which can be actuated by means of a brake pedal, and a simulation device for simulating a force/displacement action of the brake pedal, wherein the simulation device is connected in series and disposed after the emergency brake cylinder in the direction of force from the brake pedal to the emergency brake cylinder. The invention also relates to an electrohydraulic vehicle brake system with an actuating device of this kind.

A braking requirement of a driver is detected at the brake pedal, for example, in an electrohydraulic vehicle brake system and, according to this braking requirement and optionally further influencing variables, brake pressure is applied to brakes of the vehicle brake system via an electrohydraulic system (not illustrated in detail here) provided with a motor-driven pressure source. Should the electrohydraulic system fail (for example if the supply voltage in the vehicle drops), this becomes inactive, which may lead to critical running conditions, as no—or only a low—brake pressure can be applied to the brakes by the electrohydraulic system. In order that the vehicle may also be braked in such a case at least with a minimum delay according to legal requirements, a conventional hydraulic emergency actuating system is usually provided in addition to the electrohydraulic system.

DE 196 38 102 C1 describes an actuating device of the type mentioned in which a master brake cylinder can be actuated via a brake pedal. When the electrohydraulic system is inactive the master brake cylinder is connected by valve arrangements to the vehicle brakes in order that the latter may be actuated in an emergency. When the electrohydraulic system is active the master brake cylinder is connected by the valve arrangements to a simulation device which simulates the force/displacement action of the brake pedal which can be experienced by the driver according to a conventional, purely hydraulic vehicle brake system. There is a constant hydraulic connection between pressure chambers of the master brake cylinder and the simulation device when an electrohydraulic system is active. The simulation device is therefore connected in series and disposed after the master brake cylinder in the direction of force from the brake pedal to the master brake cylinder. The simulation device is in this case subject to the high pressure level in the master brake cylinder. This places a substantial load on sealing elements of the simulation device, which reduces their service life and thus the safety of the vehicle brake system.

It is also necessary when actuating the simulation device to overcome the restoring forces of spring elements disposed in the master brake cylinder, which causes difficulty in matching the force/displacement action of the brake pedal which can be experienced, in particular for the initial displacement range, with little force.

A further problem arises if the electrohydraulic system is deactivated or fails while the brake pedal is actuated. In this case the quantity of brake fluid which can be supplied to the vehicle brake is reduced by the quantity which had previously been supplied to the simulation device when the electrohydraulic system was still active. The braking power in an emergency actuation system of this kind is thus restricted and the braking distance of the vehicle undesirably long.

BRIEF SUMMARY OF THE INVENTION

The object of the invention is to improve an actuating device of the type initially mentioned such that it overcomes the above-mentioned disadvantages.

This object is achieved according to the invention by an actuating device as described above for an electrohydraulic vehicle brake system in which the emergency brake cylinder is supported at the simulation device and its piston can be locked relative to the housing such that the simulation device can be mechanically actuated by the emergency brake cylinder.

The simulation device is hydraulically uncoupled from the emergency brake cylinder by the actuating device according to the invention, so that there is no possibility of an y influence by the high pressure in the emergency brake cylinder, which would have adverse consequences. The simulation device can be operated at a considerably lower pressure level than the emergency brake cylinder, which means that sealing elements of the simulation device are not loaded to such a high degree.

A pneumatically sprung simulation device, for example, is also rendered possible by the hydraulic uncoupling. A further advantage lies in the fact that it is not absolutely necessary for the simulation device to be hydraulically damped, but this may instead be in the form of a simulation device with a purely mechanical spring arrangement.

According to an advantageous development of the actuating device according to the invention, the emergency brake cylinder is supported with its housing at the simulation device and its piston can be actuated by the brake pedal. The coupling between the brake pedal and the emergency brake cylinder may therefore be formed in the conventional manner. The housing of the emergency brake cylinder may alternatively also be moved by the brake pedal and the piston supported at the simulation device.

The actuating device is developed to advantage by providing the simulation device with a stop which can be moved against the action of at least one spring arrangement. A simulation device which is operated solely mechanically is possible as a result of such a development.

As an alternative to or combined with the development just described, the simulation device may comprise a wall which can be moved against the action of hydraulic damping. A simulation device of this kind enables the force/displacement action of a brake pedal to be simulated in a particularly precise manner.

According to a development of the invention, the stop or the wall of the simulation device is firmly connected to the housing of the emergency brake cylinder and the latter is guided with mobility in a housing of the simulation device. This provides the advantage of a very compact structure of the actuating device, as the emergency brake cylinder and the simulation device are of a telescopic configuration, so that relatively little installation space is required.

According to an advantageous configuration, the wall of the housing of the simulation device is divided into two 30 working chambers which can be connected in throttled fashion or unthrottled fashion or shut off from one another by means of at least one valve arrangement. A valve arrangement of this kind enables the force set against an actuation of the brake pedal by the simulation device to be adapted for different displacement ranges of the brake pedal.

Because the effective working faces in each case associated with the wall in the working chambers are of equal size in an advantageous configuration, the wall may be displaced in the housing of the simulation device while the volume of both working chambers together remains the same, so that there is no need to supply hydraulic fluid from outside of the simulation device.

The actuating device is also developed to advantage by connecting one of the working chambers to a reservoir for hydraulic fluid. It is thus possible to deliver the hydraulic fluid expelled from the working chamber into the reservoir and optionally dispense with a second working chamber.

According to a further advantageous configuration, a valve is disposed in a line between the working chamber connected to the reservoir and the reservoir such that, when the electrohydraulic system is active, the connection is blocked when the brake pedal is actuated and is opened when the actuation of the brake pedal is eased off. This valve, which may be formed as a non-return valve, for example, prevents hydraulic fluid from flowing out into the reservoir, so that this fluid can only flow into the second working chamber, the flow being throttled according to the simulation which is desired.

In an advantageous configuration, in which at least one pressure chamber is formed by the housing of the emergency brake cylinder and the piston thereof, which chamber is connected to a reservoir for brake fluid, and in which the above-mentioned reservoir for hydraulic fluid is identical to the reservoir for brake fluid, there is no need to provide a separate reservoir for hydraulic fluid in the vehicle brake system.

Because the simulation device is disposed such that it is stationary relative to a mounting of the brake pedal, the simulated force/displacement action is solely dependent on the movement of the brake pedal and the rigidity with which the piston is locked in the housing of the emergency brake cylinder.

In an advantageous use of an actuating device according to the invention in a vehicle brake system, the latter comprises an electrohydraulic system to actuate at least one vehicle brake, the piston of the emergency brake cylinder being locked when the electrohydraulic system is active, so that only the simulation device is actuated with the brake pedal. It is, however, also possible for the piston to be partially moved in the emergency brake cylinder when the electrohydraulic system is active, so that it also co-operates in the simulation of the force/displacement action of the brake pedal.

It is also of advantage for the simulation device to be locked when the electrohydraulic system is inactive, so that only the piston of the emergency brake cylinder moves when the brake pedal is actuated. In this respect it is alternatively possible to use a hydraulic simulation device to assist the emergency brake cylinder, in which case hydraulic pressure is also applied by the simulation device.

BRIEF DESCRIPTION OF THE DRAWING

An embodiment of an actuating device according to the invention is explained in the following with reference to the sole accompanying drawing, which shows in diagrammatic form a vehicle brake system with the actuating device represented in longitudinal section.

DETAILED DESCRIPTION OF THE INVENTION

The actuating device is substantially of rotationally symmetrical construction in relation to an axis A. It comprises an emergency brake cylinder 2 with a housing 21, in which two axially displaceable pistons 24 and 25 are disposed in series. The piston 25 projects out of the housing 21, is coupled indirectly or directly to a brake pedal 1 and can be actuated by the latter. The housing 21 and the pistons 24 and 25 define two pressure chambers 22 and 23, respectively.

The piston 24 is constructed as a floating piston and coupled to the brake pedal 1 via a spring 29 disposed between the pistons 24 and 25. The piston 24 is supported by a spring 28 in turn supported at the housing 21.

The pressure chambers 22 and 23 can be connected to a reservoir 7 for brake fluid via lines and a central valve 26 and 27, respectively, in each case disposed in a piston 24 and 25. The central valves 26 and 27 are formed as non-return valves which are open when the brake pedal 1 is not actuated, so that the pressure chambers 22 and 23 are connected to the reservoir 7 and brake fluid can flow into them. If the brake pedal 1 is actuated, the central valves 26 and 27 close on account of the pressure produced in the pressure chambers 22 and 23, respectively, the connection to the reservoir 7 is interrupted and brake pressure is built up in the pressure chambers 22 and 23.

The pressure chambers 22 and 23 of the emergency brake cylinder 2 are connected to a brake 31 and 32, respectively, via a shutoff valve 81 and 82, respectively, which can be electromagnetically actuated. The shutoff valves 81 and 82 are resiliently pre loaded into an initial position (as represented in the drawing), in which they are open. The shutoff valves 81 and 82 are closed in an actuated position.

The emergency brake cylinder 2 is mounted via its housing 21 in a housing 41 of a simulation device 4, in the form of a simulation cylinder, such that it can be displaced in the direction along the axis A. The simulation device 4 is disposed in a stationary fashion here in a vehicle (not illustrated in detail). A mobile wall 5 (or alternatively a stop or collar) is fastened to or integral with the outer circumference of the housing 21 and divides the housing 41 into two working chambers 42 and 43. The working chambers 42 and 43 are sealed off by means of sealing elements 44 and 46 between the housing 21 and the housing 41 as well as a sealing element 45 between the wall 5 and the housing 41.

In order to simulate the force/displacement action of the brake pedal 1, a spring element 6, inter alia, is provided between the housing 41 and the wall 5, which element counteracts a movement of the wall 5 (to the left in the figure, which corresponds to the actuating direction of the brake pedal 1). The spring element 6 has a progressive spring characteristic in order to simulate the force/displacement action in a particularly realistic manner. Instead of a spring element, it is alternatively also possible to use a plurality of spring elements connected in parallel and/or series as a spring arrangement, in order to achieve the desired spring characteristic.

The simulation device 4 is also hydraulically damped by the spring element 6. For this purpose the working chamber 42 may optionally be connected to an additional reservoir 7' for hydraulic fluid. It is possible to combine the reservoir 7 and the additional reservoir 7' to form a common reservoir, so that the simulation device 4 is also supplied with brake fluid.

The working chambers 42 and 43 of the simulation device 4 are connected by a line in which a gate valve arrangement 9, which can be electromagnetically actuated, is disposed. The gate valve arrangement 9 is pre loaded into an initial position, in which it is closed, and can be changed over to an actuating position, in which it transmits fluid.

If the gate valve arrangement 9 is in its transmitting actuating position, actuation of the brake pedal 1 displaces the wall 5 (to the left in the figure) towards the spring element 6, in which case the volume of the working chamber 42 decreases and the volume of the working chamber 43 simultaneously increases. Hydraulic fluid is thereby expelled from the working chamber 42 into the working chamber 43. In order to prevent hydraulic fluid from flowing back into the reservoir 7', a non-return valve is disposed in the line between the working chamber 42 and the reservoir 7', which valve only opens in a transmitting direction from the reservoir 7' to the working chamber 42, not in the opposite direction.

In the transmitting actuating position the valve arrangement 9 provides a throttle 91, with which a nonreturn valve 92 is connected in parallel. The transmitting direction of the non-return valve 92 is here selected such that, when the brake pedal 1 is actuated—when hydraulic fluid flows from the working chamber 42 to the working chamber 43—there is only a passage through the throttle 91. When the brake pedal 1 is actuated the flow of hydraulic fluid between the working chambers 42 and 43 is thus throttled, which corresponds to hydraulic damping. This results in a particularly realistic simulation of the force/displacement action of the brake pedal 1 upon actuation.

In contrast, when the actuation of the brake pedal 1 is eased off, the throttle 91 is bridged by the non-return valve 92, which is transmitting in this case, so that there is an unthrottled connection between the working chambers 42 and 43. The force/displacement action is therefore damped to a greater extent when the brake pedal 1 is actuated than when the actuation is eased off. The degree of damping may in this case be varied by the dimensioning of the throttle 92 (in particular the flow cross section thereof).

If specially adapted damping of the force/displacement action is also desired when easing off the actuation of the brake pedal 1, a further throttle may be connected in series with the non-return valve 92. It is also possible in this connection to use a valve arrangement 9 whose flow cross section can be set so as to vary in the transmitting actuating position.

In order to prevent the simulation of the force/displacement action of the brake pedal from being adversely affected by differential pressure forces acting on the wall 5, the working faces 42a and 43a in each case associated with the working chambers 42 and 43 are of equal size. This results in a pressure-compensated displacement of the wall 5 in the simulation device 4, with the quantity of hydraulic fluid flowing out of the working chamber 42 corresponding exactly to that sucked into the working chamber 43.

The actuating device functions as follows:

When the electrohydraulic system (not represented) is active (fault-free) the shutoff valves 81 and 82 are actuated, so that the lines between the pressure chambers 22 and 23, respectively, of the emergency brake cylinder 2 and the brakes 31 and 32, respectively, are shut off. In this case the brake pressure at the brakes 31 and 32 is set via the electrohydraulic system. The valve arrangement 9 is also actuated in order to establish a connection through the line between the working chambers 42 and 43 of the simulation device 4.

When the brake pedal 1 is actuated the central valves 26 and 27 block the lines to the reservoir 7. As described above, the shutoff valves 81 and 82 are in their actuating position, in which they perform a shutoff function, when the electrohydraulic system is active, so that the pressure chambers 22 and 23 of the emergency brake cylinder 2 are hydraulically closed off. The emergency brake cylinder 2—i.e. the piston 24 or 25 thereof in the housing 21—is thus locked. Actuation of the brake pedal 1 therefore only causes the housing 21 of the emergency brake cylinder 2 to be displaced in the housing 41 of the simulation device 4, with the wall 5 being moved to the left in the figure.

The simulation of the force/displacement action of the brake pedal 1 therefore takes place entirely uncoupled hydraulically from an actuation of the emergency brake cylinder 2, so that there is no possibility of impairment through reaction forces. There is in particular no possibility of the sealing elements 44, 45 and 46 being loaded by the high pressure produced in the emergency brake cylinder 2.

Should a fault occur in the electrohydraulic system, the actuation of the shutoff valves 81 and 82 and of the valve arrangement 9 is eased off in order to deactivate the electrohydraulic system and activate the emergency actuating system. This state corresponds to the initial positions of the shutoff valves 81 and 82 and of the valve arrangement 9, so that it is also automatically adopted if the supply voltage fails.

The pressure chambers 22 and 23 of the emergency brake cylinder 2 are therefore each connected to the brakes 31 and 32, respectively, when the electrohydraulic system is inactive. The line between the working chambers 42 and 43 of the simulation device 4 is shut off, as the valve arrangement 9 is in this case in its position in which it performs a shutoff function. The working chambers 42 and 43 are thus hydraulically closed off, so that the wall 5 in the housing 41 of the simulation device 4 is locked. Any actuation of the brake pedal 1 will therefore in this case only give rise to a displacement of the pistons 24 and 25 in the housing 21 of the emergency brake cylinder 2, with the latter being actuated such that brake pressure is applied to the brakes 31 and 32. The emergency actuation therefore takes place entirely uncoupled from the simulation of the force/displacement action of the brake pedal 1, so that there is no possibility of any impairment of the braking power in the case of an emergency actuation.

What is claimed is:

1. An actuating device for an electrohydraulic vehicle brake system, with
    an emergency brake cylinder which comprises a piston and a housing, which piston is displaceable in the housing, and which can be actuated by means of a brake pedal, and
    a simulation device for simulating a force/displacement action of the brake pedal, wherein
        the simulation device is connected in series and disposed after the emergency brake cylinder in the direction of force from the brake pedal to the emergency brake cylinder, and wherein
        the emergency brake cylinder is supported with its housing at the simulation device and the piston can be locked relative to the housing such that the simulation device can be mechanically actuated by the emergency brake cylinder.

2. The actuating device according to claim 1 wherein the simulation device comprises a wall which can be moved against the action of hydraulic damping.

3. The actuating device according to claim 2, the wall of the housing of the simulation device is divided into two working chambers which can be connected in throttled fashion or unthrottled fashion or shut off from one another by means of at least one valve arrangement.

4. The actuating device according to claim 3, one of the working chambers being connected to a reservoir for hydraulic fluid.

5. The actuating device according to claim 4, a valve is disposed in a line between the working chamber connected to the reservoir and the reservoir such that when the electrohydraulic system is active, the line is blocked when the brake pedal is actuated and the connection is opened when the actuation of the brake pedal is eased off.

6. The actuating device according to claim 5, at least one pressure chamber is formed by the housing of the emergency brake cylinder and the piston thereof, which chamber is connected to a second reservoir for brake fluid, wherein the second reservoir is identical to the reservoir.

7. The actuating device according to claim 4, at least one pressure chamber being formed by the housing of the emergency brake cylinder and the piston thereof, which chamber is connected to a second reservoir for brake fluid, wherein the second reservoir is identical to the reservoir.

8. The actuating device according to claim 7, the housing of the simulation device being disposed such that it is stationary relative to a mounting of the brake pedal.

9. The actuating device according to claim 3, the wall defining two effective working faces in the working chambers that are of equal size.

10. The actuating device according to claim 9, one of the working chambers being connected to a reservoir for hydraulic fluid.

11. The actuating device according to claim 10, a valve is disposed in a line between the working chamber connected to the reservoir and the reservoir such that when the electrohydraulic system is active, the line is blocked when the brake pedal is actuated and the connection is opened when the actuation of the brake pedal is eased off.

12. The actuating device according to claim 11, at least one pressure chamber being formed by the housing of the emergency brake cylinder and the piston thereof, which chamber is connected to a second reservoir for brake fluid, wherein the second reservoir is identical to the reservoir.

13. The actuating device according to claim 2, the stop or the wall of the simulation device being firmly connected to the housing of the emergency brake cylinder, and the emergency brake cylinder being guided with mobility in a housing of the simulation device.

14. The actuating device according to claim 1, the simulation device comprises a stop which can be moved against the action of at least one spring arrangement.

15. The actuating device according to claim 14, the stop or the wall of the simulation device being firmly connected to the housing of the emergency brake cylinder, and the emergency brake cylinder being guided with mobility in a housing of the simulation device.

16. The actuating device according to claim 15, the housing of the simulation device being disposed such that it is stationary relative to a mounting of the brake pedal.

17. The actuating device according to claim 14 wherein the simulation device comprises a wall which can be moved against the action of hydraulic damping.

18. The actuating device according to claim 17, the stop or the wall of the simulation device being firmly connected to the housing of the emergency brake cylinder, and the emergency brake cylinder being guided with mobility in a housing of the simulation device.

19. An electrohydraulic vehicle brake system, including an actuating device according to claim 1.

20. An actuating device for an electrohydraulic vehicle brake system, with an emergency brake cylinder, which can be actuated by means of a brake pedal and in the housing of which a displaceable piston is disposed, and a simulation device for simulating a force/displacement action of the brake pedal, wherein the simulation device is connected in series and disposed after the emergency brake cylinder in the direction of force from the brake pedal to the emergency brake cylinder, the housing of the emergency brake cylinder can be actuated by the brake pedal and the emergency brake cylinder is supported with its piston at the simulation device and the piston can be locked relative to the housing such that the simulation device can be mechanically actuated by the emergency brake cylinder.

21. An electrohydraulic vehicle brake system, including an actuating device according to claim 5.

22. The vehicle brake system according to claim 21, wherein the piston of the emergency brake cylinder is locked when the electrohydraulic system is active.

23. The vehicle brake system according to claim 22, wherein the simulation device is locked when the electrohydraulic system is inactive, so that only the piston of the emergency brake cylinder moves when the brake pedal is actuated.

* * * * *